(12) United States Patent
Ofer et al.

(10) Patent No.: US 7,146,439 B1
(45) Date of Patent: Dec. 5, 2006

(54) MANAGEMENT OF BACKGROUND COPY TASK FOR POINT-IN-TIME COPIES

(75) Inventors: Adi Ofer, Wellesley, MA (US); Daniel E. Rabinovich, Wrentham, MA (US); Stephen R. Ives, Shrewsbury, MA (US); Peng Yin, South Grafton, MA (US); Cynthia J. Burns, Franklin, MA (US); Ran Margalit, Providence, RI (US); Rong Yu, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 201 days.

(21) Appl. No.: 10/607,653

(22) Filed: Jun. 27, 2003

(51) Int. Cl.
*G06F 3/00* (2006.01)
(52) U.S. Cl. ......................................... 710/45; 710/40
(58) Field of Classification Search ................ 710/45, 710/40; 707/204, 205; 718/102, 103
See application file for complete search history.

(56) References Cited

U.S. PATENT DOCUMENTS

| 5,193,189 A * | 3/1993 | Flood et al. ................. 718/103 |
| 5,742,825 A * | 4/1998 | Mathur et al. ............... 719/329 |
| 6,609,145 B1 * | 8/2003 | Thompson et al. .......... 718/103 |
| 6,754,897 B1 | 6/2004 | Ofer et al. ................... 718/103 |
| 6,904,470 B1 | 6/2005 | Ofer et al. ...................... 710/6 |
| 2002/0184580 A1 * | 12/2002 | Archibald et al. .......... 714/719 |
| 2003/0061362 A1 * | 3/2003 | Qiu et al. .................... 709/229 |
| 2004/0025162 A1 * | 2/2004 | Fisk ............................ 718/105 |
| 2004/0111410 A1 * | 6/2004 | Burgoon et al. ................ 707/4 |

* cited by examiner

*Primary Examiner*—Fritz Fleming
*Assistant Examiner*—Harold Kim
(74) *Attorney, Agent, or Firm*—Daly, Crowley, Mofford, and Durkee, LLP (57) ABSTRACT

A scheduling method and apparatus for use by a processor that controls storage devices of a data storage system is presented. The method allocates processing time between I/O operations and background operations for predetermined time slots based on an indicator of processor workload.

11 Claims, 7 Drawing Sheets

MANAGEMENT OF BACKGROUND COPY TASK FOR POINT-IN-TIME COPIES

BACKGROUND

The invention relates generally to data storage systems, and in particular, to job scheduling.

In typical data storage systems, a storage controller serves as an interface between external host computers and the physical storage devices of the data storage system, and thus controls all back-end (or device-side) operations. The back-end operations can include services for I/O, such as read misses, write destaging and read prefetching. The back-end operations can also include non-I/O background operations, e.g., activities related to data copy, and other activities. The scheduling of these two classes of back-end operations, that is, I/O operations and background operations, which compete with each other for storage controller resources, has a major effect on the performance of the data storage system as a whole.

SUMMARY

In an aspect of the invention, task scheduling for use by a processor that controls storage devices of a data storage system includes allocating processing time between I/O operations and background operations for predetermined time slots based on an indicator of processor workload.

Among the advantages of the scheduling mechanism of the invention are the following. The scheduler balances scheduling of I/O tasks and background tasks so that both are serviced (and thus neither are starved). In addition, the scheduler ensures that the scheduling of different types of background tasks is fair. Further, the scheduling mechanism operates to maximize the amount of time devoted to background tasks at the expense of idle time without impacting the amount of time allocated to I/O tasks. The scheduling technique is dynamic in nature and adjusts scheduling decision criteria automatically based on CPU load, thus resulting in improved performance for the data storage system as a whole. The architecture is highly flexible, as it can be implemented to use a simple lookup table and many parameters are user-configurable Other features and advantages of the invention will be apparent from the following detailed description, and from the claims.

BRIEF DESCRIPTION OF THE DRAWINGS

Like reference numerals will be used to represent like elements.

DETAILED DESCRIPTION

Figure 1:
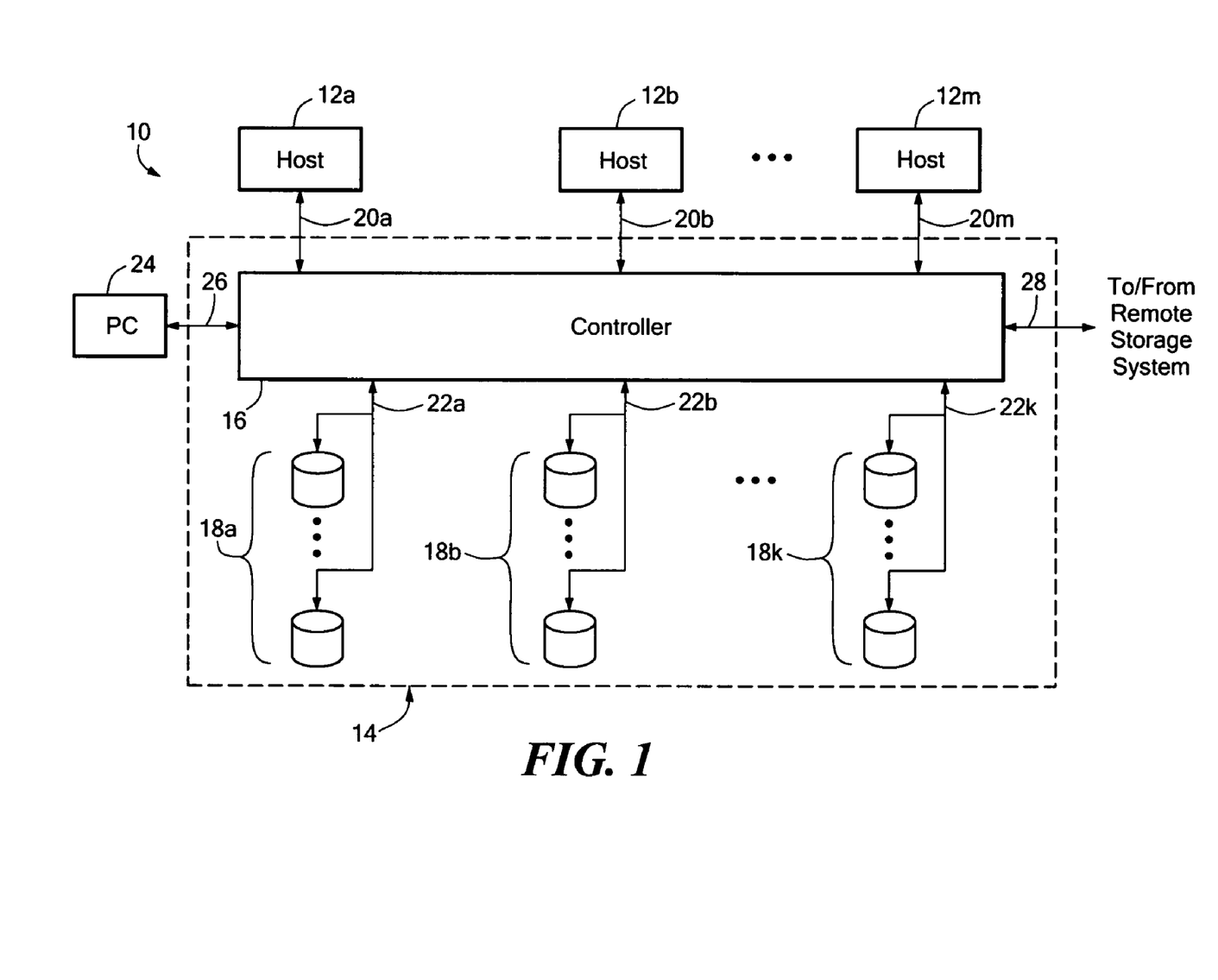
FIG. 1 is a block diagram of a data storage system that includes a storage controller in which the invention can be employed.

Referring to FIG. 1, a data processing system 10 includes a plurality of host computers 12a, 12b, . . . , 12m, connected to a data storage system 14. The data storage system 14 can be, for example, that made by EMC Corporation and known as the Symmetrix® data storage system. The data storage system 14 receives data and commands from, and delivers data and responses to, the host computers 12. The data storage system 14 is a mass storage system having a controller 16 coupled to pluralities of physical storage devices (or, simply, physical devices) shown as physical disks 18a, physical disks 18b, . . . , physical disks 18k. Each of the physical devices 18 is logically divided, in accordance with known techniques, into one or more logical volumes.

The controller 16 interconnects the host computers 12 and the physical devices 18. The controller 16 thus receives memory write commands from the various host computers over buses 20a, 20b, . . . , 20m, respectively, and delivers the data associated with those commands to the appropriate physical devices 18a, 18b, . . . , 18k, over respective connecting buses 22a, 22b, . . . , 22k. The controller 16 also receives read requests from the host computers 12 over buses 20, and delivers requested data to the host computers 12, either from a cache memory of the controller 16 or, if the data is not available in cache memory, from the physical devices 18. Buses 20 can be operated in accordance with any one of a number of different bus protocols, such as Fibre Channel, SCSI, FICON and ESCON, to name but a few. Likewise, buses 22 can also be operated in accordance with any one of a number of different bus protocols, for example, Fibre Channel, SCSI and Serial ATA, as well as others.

In a typical configuration, the controller 16 also connects to a console PC 24 through a connecting bus 26. Console PC 24 is used for maintenance and access to the controller 16 and can be employed to set parameters of the controller 16 as is well known in the art.

Figure 2:
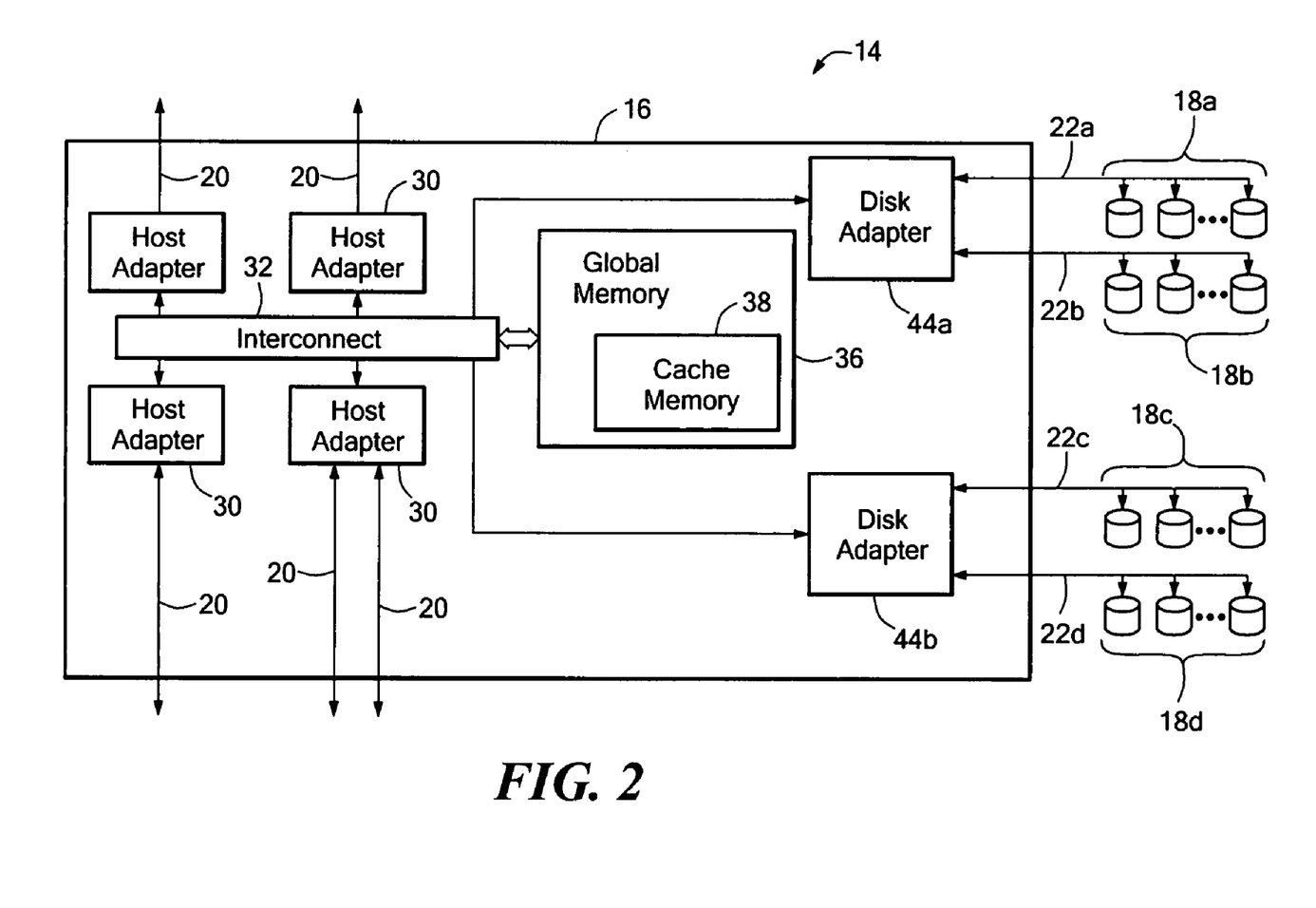
FIG. 2 is a detailed block diagram of the storage controller shown in FIG. 1.

In operation, the host computers 12a, 12b, . . . send, as required by the applications they are running, commands to the data storage system 14 requesting data stored in the logical volumes or providing data to be written to the logical volumes. Referring to FIG. 2, and using the controller in the Symmetrix® data storage system as an illustrative example, details of the internal architecture of the data storage system 14 are shown. The communications from the host computer 12 typically connects to a port of a plurality of host adapters 30 over the bus lines 20. Each host adapter, in turn, connects to a global memory 36 via an interconnect 32. The interconnect can be, for example, a bus structure, a point-to-point interconnect such as a crossbar structure, or any other type of interconnect. The global memory 36 includes a cache memory 38 for storing data, as well as various data structures (not shown) for maintaining control information.

Also connected to the global memory 36 through the interconnect 32 are device adapters shown as disk adapters 44, which control the physical devices 18 and handle the controller's back-end operations. The host adapters 30 can communicate with the disk adapters 44 through either the global memory 36 or some other messaging scheme. In one embodiment, the disk adapters are installed in controller 16 in pairs. Thus, for simplification, only two disk adapters, indicated as disk adapters 44a and 44b, are shown. However, it will be understood that additional disk adapters may be employed by the system.

Each of the disk adapters 44a, 44b supports multiple bus ports, as shown. For example, the disk adapter (DA) 44a connects to buses 22a and 22b, and DA 44b connects to buses 22c and 22d. Each DA can support additional buses as well. Connected to buses 22a and 22b are a plurality of physical devices (shown as disk drive units) 18a and 18b, respectively. Connected to the buses 22c, 22d are the plurality of physical devices 18c and 18d, respectively. The DAs 44, buses 22 and devices 18 may be configured in such a way as to support redundancy, e.g., the devices 18 on the buses 22 can include both primary and secondary devices.

The back-end operations of the disk adapters 44 include services for I/O operations involving accesses to the physical devices 18, such as read misses, write destaging and read prefetching, to give but a few examples, and services for non-I/O background operations. These two categories of operations are referred to herein as operations classes. The background operations include activities such as those performed by snapshot point-in-time data copy applications, e.g., SnapView™, from EMC Corporation) and other data copy applications (e.g., TimeFinder™, also from EMC Corporation). These kinds of background tasks take a relatively long time to execute. More generally, a background task can be any task that does not access the physical storage devices 18. Background tasks required for data copy, in particular, are central to many controller operations and management functions. While the background tasks are important, they compete with the I/O tasks for DA processing resources. Thus, the priority of the background tasks cannot be set so low as to starve these tasks, or set so high as to starve the I/O tasks either. Multiple pending background tasks of the same type or different types need to be handled efficiently and fairly as well or performance will suffer. The disk adapters 44 thus incorporate a special, high-level scheduling mechanism to balance these needs, as will be described with reference to FIG. 3.

Figure 3:
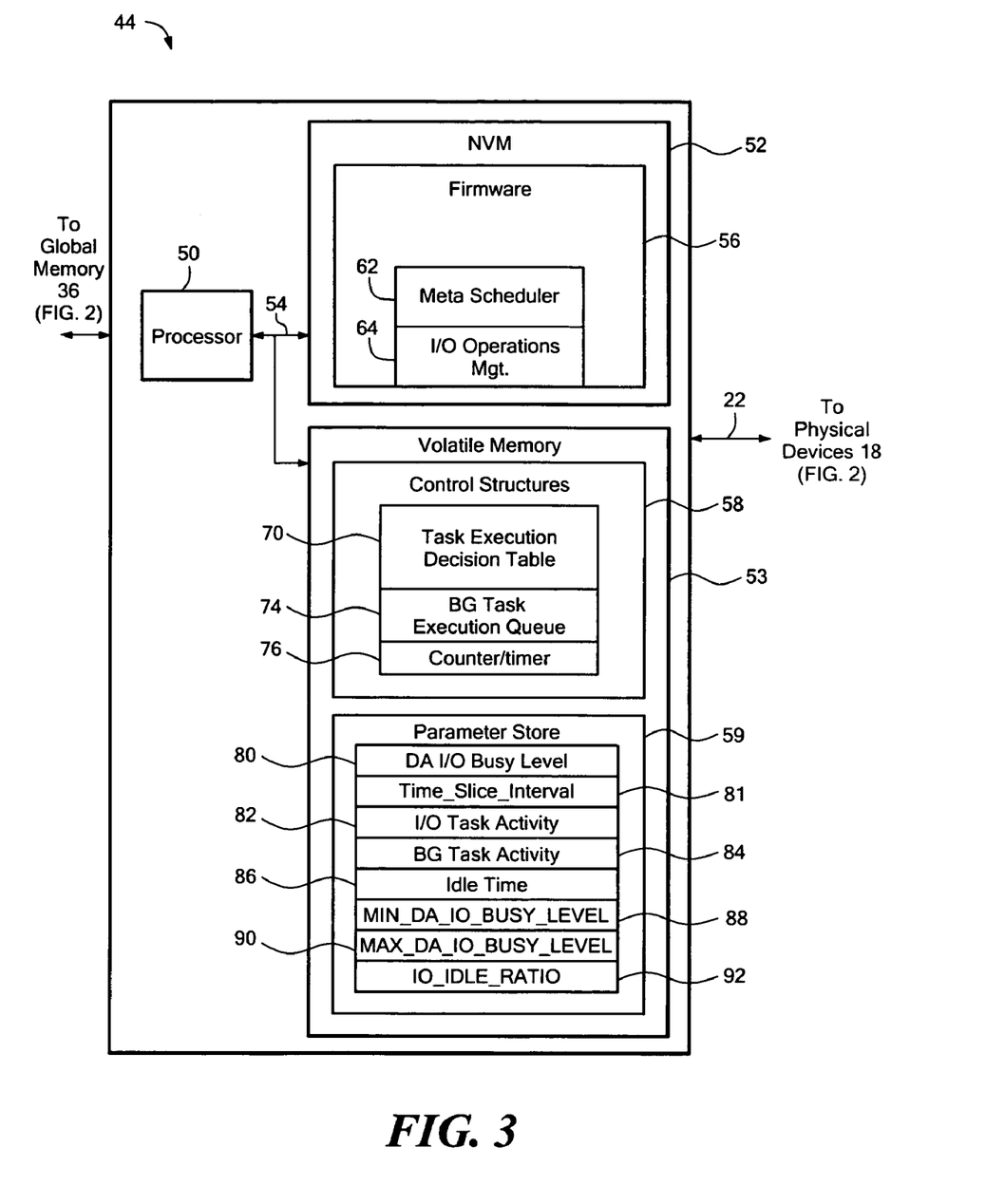
FIG. 3 is a block diagram of the disk adapter (from FIG. 2) and its firmware processes, in particular, a meta scheduler used to select between execution of I/O tasks and background tasks.

As shown in FIG. 3, each disk adapter (DA) 44 includes at least one processor 50 coupled to a local, nonvolatile memory (NVM), e.g., FLASH memory, 52 and a volatile memory 53 by an internal bus structure 54. The processor 50 controls the overall operations of the disk adapter and communications with the local memories 52 and 53. The local NVM 52 stores firmware 56, and is read each time the data storage system 10 is initialized. Stored in the volatile memory 53 are control data structures 58 and parameter data stored in a parameter store 59. The firmware 56 is copied to the processor's internal RAM (or the volatile memory 53), at initialization for subsequent execution by the processor 50. Included as a component of the firmware 56 is a meta scheduler 62 to schedule between the two classes of operations, background operations and I/O operations involving devices 18 supported by the DA 44, in particular, the DA processor 50. The firmware 56 further includes I/O operations management 64. The I/O operations management block 64 is intended to represent any and all processes which control the I/O operations. In one embodiment, as will be described below with reference to FIG. 4, the management of background operations is implemented, in part, as a queue. Other processes and/or structures may be used to manage background operations. The operation of the meta scheduler 62 will be described in further detail later.

The control data structures 58 include: a task execution decision table 70; at least one task execution queue including a non-I/O background task queue 74 and a counter/timer 76. Although not shown, other control structures, such as local bit maps that track pending I/O jobs and device records, may be stored as well. The information in the control structures 58 is managed by the DA 44 and used by various processes of the firmware 56.

The parameters stored in the parameter store 59 include the following: a DA I/O busy level 80 (which maintains the most recent I/O busy level value computed for the DA); time_slice_interval 81, which defines the DA processor execution time unit for task execution; I/O task activity, background task activity and idle time statistics 82, 84 and 86, respectively; a minimum DA I/O busy level (MIN_DA_IO_BUSY_LEVEL) 88; a maximum DA I/O busy level (MAX_DA_IO_BUSY_LEVEL) 90; and an IO_IDLE_RATIO 92. The DA I/O busy level is computed periodically and frequently.

The DA I/O busy level is based on the I/O busy levels of the devices supported by the DA 44 and is therefore an indicator of DA I/O workload. In the illustrated embodiment, the DA I/O busy level is a value between 1 and 15, inclusive, with 15 corresponding to the highest DA I/O busy level. The I/O, background and idle statistics keep track of what percentage of time is spent performing I/O tasks and background tasks, and what percentage of time the controller is idle. Under certain conditions, as will be described, the meta scheduler 62 uses the minimum DA I/O busy level 88 as a lower bound to ensure that a certain percentage of time is used for the execution of I/O tasks and the maximum DA I/O busy level 90 as an upper bound to limit the percentage of I/O task execution time. The IO_IDLE RATIO 92 is a configurable parameter that is used to set an amount of idle time relative to I/O task execution time. A portion of the idle time is fixed. Thus, if it is desirable to have 1/N of the total I/O time (where I/O time=[I/O task activity time+idle time−fixed idle time], that is, non-background-task time) be non-fixed idle time, the ratio 92 is set to N. The value of N should be greater than 1.

Figure 4:
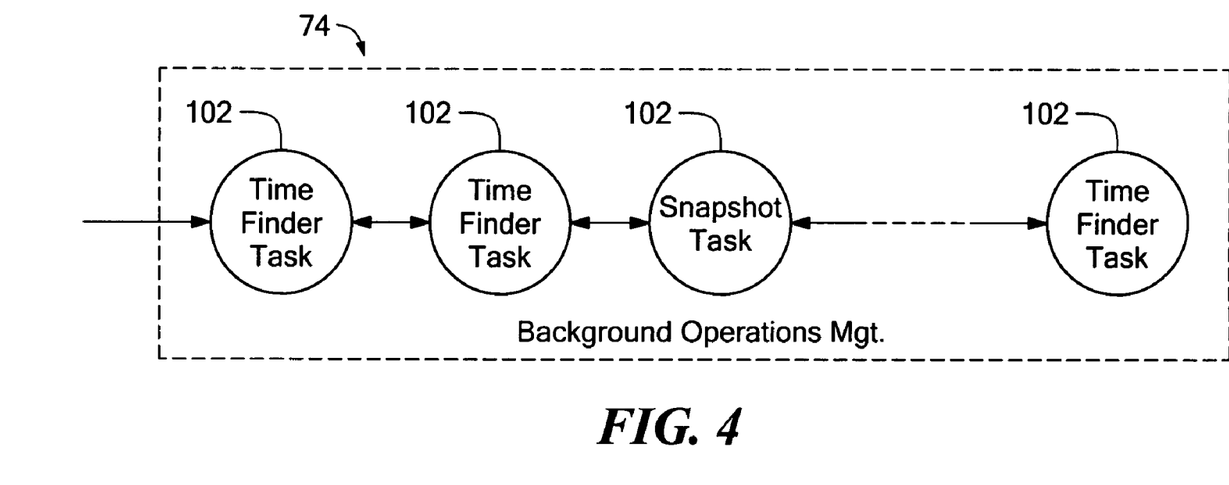
FIG. 4 is a depiction of a background task execution queue for maintaining pending background tasks.

FIG. 4 illustrates the background task execution queue 74, which is used for background operations management. The DA 44 maintains a list of all currently pending background tasks on the queue. In one embodiment, the tasks on the queue are created by I/O operations in response to an external request, such as a host request. The tasks on the queue can be of the same task type or, alternatively, can include different, independent tasks handled by different functions (or applications), for example, Snapshot and TimeFinder, as shown. While only one queue to support the background tasks (background operations class) is shown, it will be appreciated that any number of background task execution queues may be used, along with an intermediate level selection mechanism, e.g., round robin or other selection scheme, to select from among the queues of each class. Thus, the single queue depicted in FIG. 4 serves to represent one or more queues for the pending background tasks.

Figure 5:
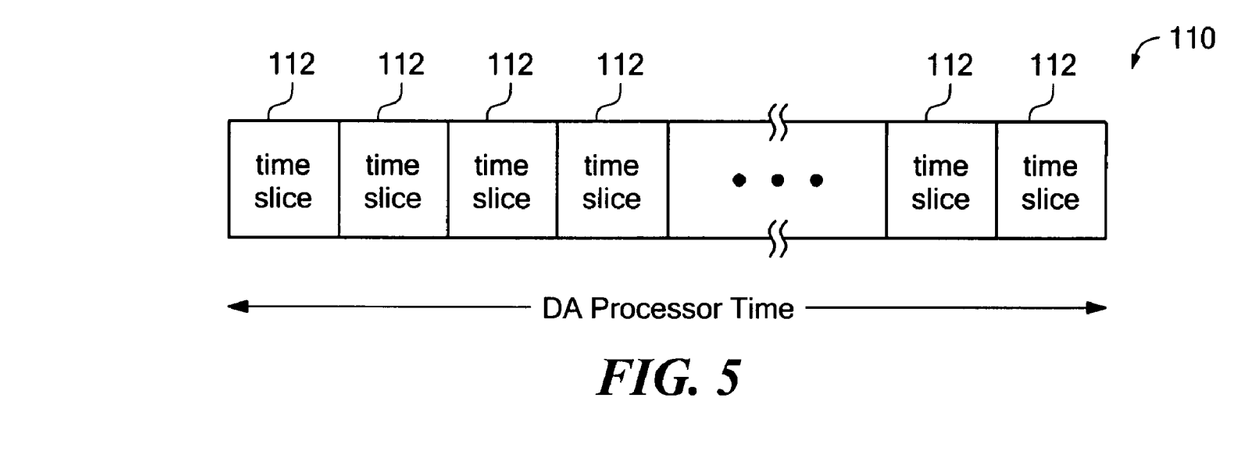
FIG. 5 is a depiction of disk adapter CPU time in terms of task execution time slices.

FIG. 5 shows DA processor time 110, which is partitioned into a plurality of time slices (or time slots) 112. The time slice interval is defined according to the value set in the parameter time_slice_interval 81, in the parameter store 59 (FIG. 3). The interval can be, e.g., 10 ms, or any desired unit of time. Each time slice 112 is allocated for dedicated use by one or more I/O tasks (via the I/O operations management 64, from FIG. 3) or a task (or tasks) 102 from the background execution queue 74 by the meta scheduler 62. Typically, the duration of I/O tasks is so small that at least one I/O task is completed in a given time slice, while execution of a single background task 102 may consume more than the one allotted time slice. If a background task is selected for execution in a time slice and is not completed in that time slice, that task is placed at the end of the background execution queue 74. The background tasks that are completed are simply removed from the background task execution queue 74.

Figure 6:
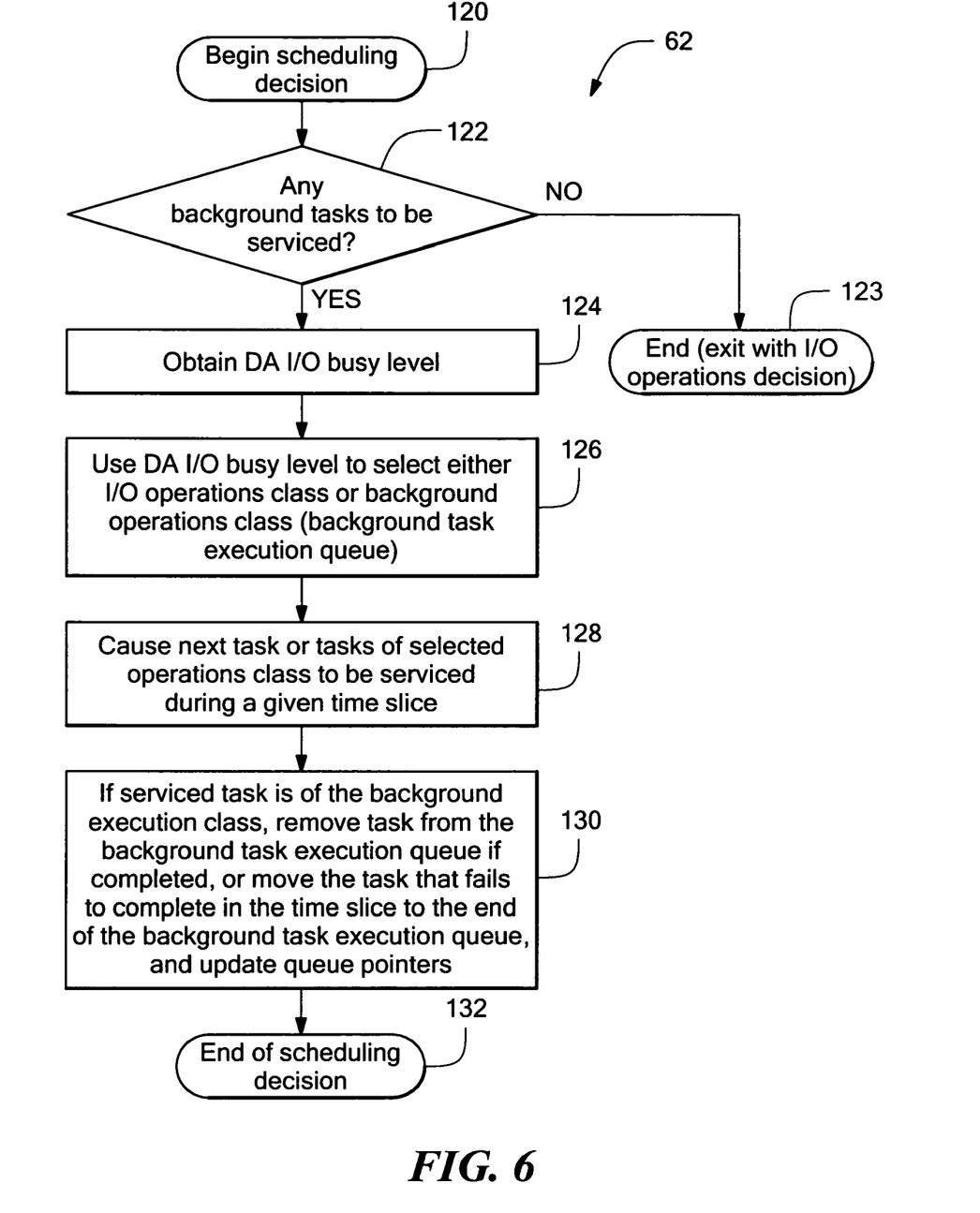
FIG. 6 is a flow diagram of the meta scheduler.

Referring to FIG. 6, an overview of the meta scheduler 62 is shown. The meta scheduler 62 commences a job scheduling decision (step 120). The meta scheduler 62 determines if there are any pending background tasks (e.g., by determining if the background execution queue 74 is empty)(step 122). If it is determined that there are no pending background tasks, the meta scheduler 62 exits (with an I/O operations decision) as no further scheduling at this level, that is, between I/O operations and some other class of operations, is needed. Also, although not shown in the figure, the DA I/O busy level is set to a default value so that the meta scheduler will have some value to start with the next time background activity is introduced. If it is determined that there are pending background tasks, the meta scheduler 62 obtains the I/O busy level of the DA (step 124). The DA I/O busy level may be computed or a current (stored) value of the DA I/O busy level may be used, as will be described later with reference to FIG. 8. Still referring to FIG. 6, the meta scheduler 62 uses the DA I/O busy level to determine if the task or tasks to execute in the next time slice will come from the class of I/O operations or the class of background operations (via the background task execution queue, in the case of background operations), that is, the meta scheduler 62 decides which class of operations owns the next time slice (step 126). Once the operations class has been selected, the meta scheduler 62 causes the next task or tasks from the selected operations class to be serviced during the time slice (step 128). More specifically, in the case of the background operations class being selected, the meta scheduler 62 selects the next task on the queue by invoking the appropriate function that handles that task. The selected task is serviced via the invoked function during the given time slice. When the allocated time has elapsed, the function returns to the meta scheduler 62. When the serviced task is a background task, the meta scheduler 62 which removes the task from the background task execution queue if that task has been completed, or moves the task to the end of the queue of the task is only partially completed, and updates the queue pointers as appropriate (step 130). The meta scheduler 62 terminates and awaits the next scheduling decision (step 132).

If the I/O operations class is selected, the processes of the I/O operations management block 64 (FIG. 3), including other scheduler processes, will operate to select a logical volume (and an operation on that logical volume) to process and generate the job for execution. An example of a mechanism which can be used to perform the logical volume selection is described in a co-pending U.S. application entitled "Improved Device Selection by a Disk Adapter Scheduler", in the name of Ofer et al., filed Mar. 26, 2003, and assigned application Ser. No. 10/397,403, incorporated herein by reference. An example of a mechanism which can be used to perform the operation selection is described in a co-pending U.S. application entitled "Operation Prioritization and Selection in a Probability-Based Job Scheduler," in the name of Ofer et al., filed Nov. 12, 1999, and assigned application Ser. No. 09/438,913, incorporated herein by reference. Other device and operation selection techniques that are known in the art can also be used.

Figure 7:
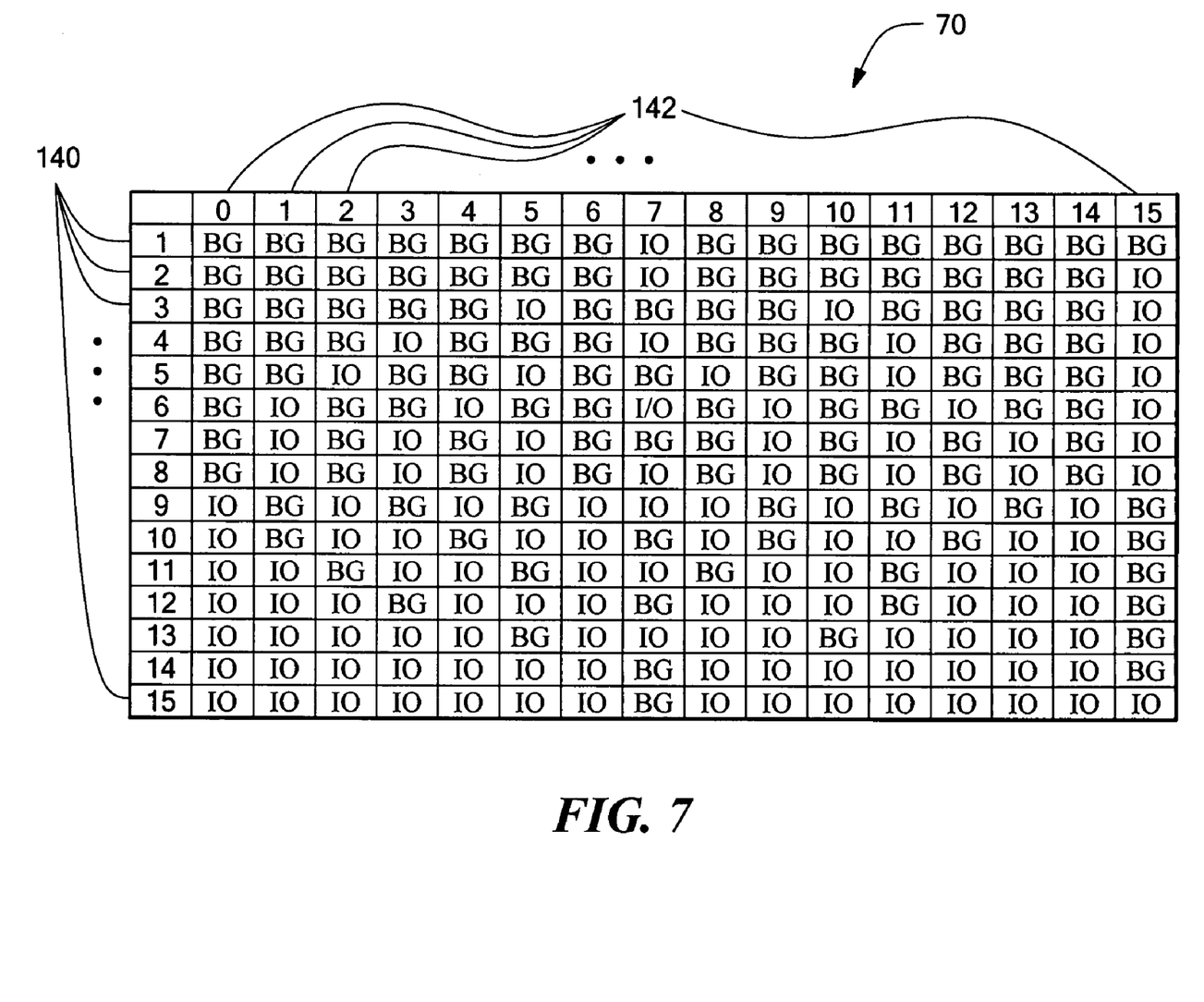
FIG. 7 is a task execution decision lookup table used by the meta scheduler in choosing between I/O operations and background operations (background tasks on the background task execution queue, shown in FIG. 4).

Deciding between I/O and background operations is probability driven through table-based lookup. Referring to FIG. 7, an example of the task execution decision table 70 used by the meta scheduler 62 for the operations selection (step 126, FIG. 6) is shown. The table 70, which is populated with elements representing the two classes of operations, that is, I/O and background operations, based on time slice assignments, governs the selection. Each row 140 corresponds to one of the fifteen DA I/O busy levels and each column 142 corresponds to a time slice. The row is selected as the DA I/O busy level (obtained at step 124, from FIG. 6). The column selection is managed by a time management mechanism, for example, a counter/timer (such as counter/time 76, from FIG. 3) which keeps track of the progression of time slices and indicates the next time slice to be chosen in the selected row. The table elements include 'BG' and 'IO', with 'BG' representing the background operations (background task execution 74) and 'IO' the I/O operations. In the illustrated embodiment, each row has sixteen entries and each entry corresponds to a time slice that represents $\frac{1}{16}$ of the DA processing time, i.e., ~6%. Each row changes the I/O task/background task scheduling decision by 6% compared with the previous row, that is, beginning with row 1, each subsequent row contains one more I/O operations entry and one less background operations entry than the previous row.

As mentioned earlier, the DA I/O busy level (table row) 140 determines what percentage of time should be spent on I/O tasks versus background tasks. The percentage is dependent on how busy the DA is with I/O operations. In the example shown, the DA I/O busy levels range from 1 to 15 with the maximum value of '15'. The table elements are populated according to the percentages. The lower the DA I/O busy level, the greater the percentage of background tasks assigned to time slices, for example, row 1 (DA I/O busy level 1) has 6% I/O tasks to 94% background tasks and row 15 has 6% background tasks to 94% I/O tasks. Thus, as the DA I/O busy level increases, so too does the percentage of I/O tasks relative to background tasks. Preferably, the elements of each class in a given row are distributed in a uniform manner to ensure scheduling fairness.

When the meta scheduler 62 is ready to make a scheduling decision, and referring back to FIG. 6, the meta scheduler 62 uses a DA I/O busy level 140 and a column (count) value 142 as indices into the table 70. Thus, the meta scheduler 62 determines if it is time to perform a background or I/O task (step 126, FIG. 6), by accessing the table element located at the row corresponding to the DA I/O busy level and the column corresponding to the next time slice. If the table lookup yields a 'BG', the meta scheduler 62 accesses the background task execution queue. Otherwise, if the table lookup results in an 'IO', the meta scheduler 62 signals to the I/O operations management block 64 (FIG. 3) to commence I/O scheduling and execution.

One of the goals of the meta scheduler is to maximize the amount of time allotted to background activity without adversely effecting the I/O activity. The meta scheduler achieves this goal by attempting to minimize the non-fixed idle time, as well as enlarge the background time at the expense of the non-fixed idle time. In a healthy system, however, there is a natural fraction of the time in which the system is idle, so it may not be desirable to eliminate the non-fixed idle time completely. Thus, the meta scheduler uses the configurable IO_IDLE_RATIO parameter 92 (FIG. 3) to determine how much non-fixed idle time should remain. For example, if it is desirable to have $\frac{1}{10}$ of the I/O time (=I/O activity time+idle time−fixed idle time=non-background time) be idle time, then this parameter will be set to 10. Also, it may be recalled from the above description that MIN_DA_IO_BUSY_LEVEL 88 can be used to ensure a certain percentage of I/O time and MAX_DA_IO_BUSY_LEVEL 90 can be used to limit the percentage of I/O time.

Figure 8:
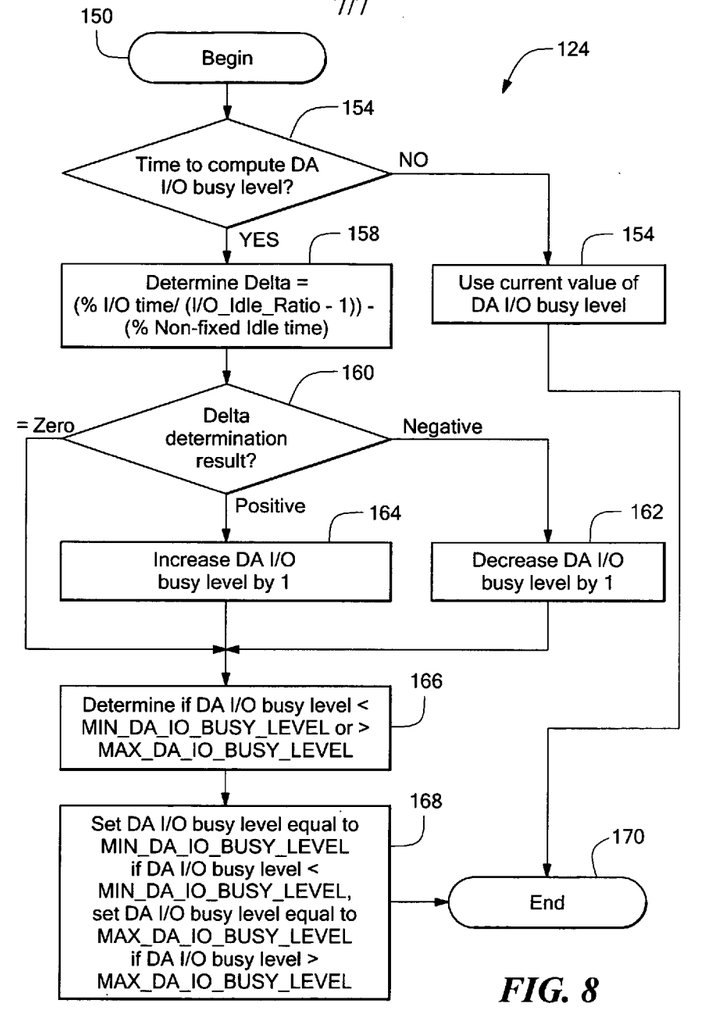
FIG. 8 is an example of how the disk adapter's I/O busy level (used to index into the lookup table of FIG. 7) can be determined.

With these parameters in mind, and referring now to FIG. 8, the process of determining the DA I/O busy level (step 124, FIG. 6) may be performed in the following manner. The process begins (step 150) by determining if it is time to compute the DA I/O busy level (step 154). In the illustrated embodiment, the DA I/O busy level is computed each time the meta scheduler finishes a row in the task execution decision table 70 so that a certain probability between the two classes of operations is achieved at one DA I/O busy level. Other techniques may be used as well. For example, the process could compare the timestamp of the current value to determine if enough time has elapsed since it was last computed. If it is not time to compute the DA I/O busy level, the process uses the current value of the DA I/O busy level as the DA I/O busy level for the table lookup (step 156). If the process determines (at step 154) that it is time to compute the DA I/O busy level, the process performs additional steps. It determines a value "Delta", the amount of time to be transferred between the idle time and the background activity time by computing the % of time being spent on I/O activity time divided by (IO_IDLE_RATIO−1) and subtracting from that result the % of time that the controller is idle (not including the fixed idle time)(step 158). The time percentages are part of the activity statistics maintained by the DA in local memory. The process then determines if Delta is a positive or negative value, or equal to zero (step 160). If Delta is a negative value, the process decrements the DA I/O busy level by 1 (step 162). Thus, if Delta is negative, time is taken away from the time dedicated to the I/O activity. If the value of Delta is positive, the process instead increments the DA I/O busy level by 1 (step 164). If Delta is equal to zero, no change is made to the DA I/O busy level. At this stage the process applies the MIN/MAX restriction to the DA I/O busy level, that is, it determines if the DA I/O busy level is less than MIN_DA_IO_BUSY_LEVEL or greater that MAX_DA_IO_BUSY_LEVEL (step 166). The process forces the DA I/O busy level to the value of MIN_DA_IO_BUSY_LEVEL if the DA I/O busy level is less than this lower bound, and artificially limits the DA I/O busy level by setting it to MAX_DA_IO_BUSY_LEVEL if the DA I/O busy level is greater than the upper bound of MAX_DA_IO_BUSY_LEVEL (step 168). Once this adjustment has been completed, the process exits (step 170).

If the process chooses Delta wisely, it achieves the optimal situation, i.e., the 1/IO_IDLE_RATIO of the new I/O time will be idle. Since the I/O time is just the sum of the I/O activity time, then:

(non-fixed idle time+Delta)/(non-fixed idle time+ Delta+I/O activity time)=1/IO_IDLE_RATIO.

To be conservative and to ensure smooth transitions, the process does not move the entire Delta time between the idle and the background, but rather just changes it by a unit of 1 (=6%, as described above). Since the algorithm is executed frequently and periodically (as earlier described), the DA I/O busy level value is adjusted automatically as the load on the machine varies.

In one embodiment, and referring back to FIGS. 6–7, because some background tasks may misbehave by consuming more than the allotted time slice for execution, the selection of decision table column is made relative to the completion (or "exit" time of the last selected task). That is, the meta scheduler 62 keep tracks of the last column selected (last_column), the current time (current_time) and the time at which the last background time slice ended (BG_exit_time) via counter/timer 76, and selects the next column according to the following: '[(((Current_time-BG_exit_time)/(time_slice_interval))+last_column+1] modulo 16'. This column selection computation minimizes column skipping that might occur as a result of the misbehaved background tasks, thus ensuring fairness and balance in the scheduling algorithm.

Scheduler utilities allow the task execution decision table 70 to be displayed and modified, and for scheduler/job related statistics to be displayed. The table 70 and parameters in the parameter store 59 may be modified (via the service management console PC) off-line or while the system is in use to fine-tune the performance of the DA and the system as a whole. Thus, the architecture of the meta scheduler is a highly flexible one.

It is to be understood that while the invention has been described in conjunction with the detailed description thereof, the foregoing description is intended to illustrate and not limit the scope of the invention, which is defined by the scope of the appended claims. Other embodiments are within the scope of the following claims. All publications and references cited herein are expressly incorporated herein by reference in their entirety.

What is claimed is:

1. A method of scheduling for use by a processor that controls storage devices of a data storage system, comprising:

allocating processing time between I/O operations and background operations for predetermined time slots based on an indicator of processor workload, wherein the indicator is an indicator of I/O loading on the processor and comprises a plurality of busy levels indicative of different levels of I/O loading on the processor, and wherein allocating comprises using a lookup table comprising rows corresponding to the busy levels, wherein each row comprises a plurality of elements corresponding to the predetermined time slots, and wherein the background operations comprise pending background tasks maintained on a queue and wherein allocating further comprises:

causing an I/O task to be selected for execution in a next one of the predetermined time slots if the selected one of the I/O or background operations elements is an I/O operations element; and otherwise selecting a next one of the pending background tasks from the queue for execution in a next one of the predetermined time slots if the selected one of the I/O or background operations elements is a background operations element.

2. The method of claim 1, wherein the elements correspond to I/O operations and background operations, and the lookup table is populated with the elements corresponding to I/O operations and background operations according to time percentages defining amounts of time allocated to tasks associated with such operations.

3. The method of claim 2 wherein the time percentages are user-configurable parameters.

4. The method of claim 2 wherein allocating comprises determining the indicator by determining the busy level and wherein the determined busy level is used to index into the lookup table to select one of the I/O or background operations elements.

5. The method of claim 4 wherein the time percentages change with each row.

6. The method of claim 4 wherein the time percentage of the I/O operations elements increases as the busy levels increase.

7. The method of claim 1 wherein the I/O operations elements and the background operations elements are distributed uniformly throughout a given row according to their respective time percentages.

8. The method of claim 1 wherein the busy level is levels are computed at periodic intervals.

9. The method of claim 1 wherein allocating comprises determining the indicator by determining the busy level and wherein determining the busy level comprises:

obtaining a most recently computed value of the busy level;

examining statistics related to idle time as well as time spent performing I/O tasks associated with I/O operations and non-I/O background tasks associated with background operations;

using the statistics to redistribute time between the idle time and the time spent performing the non-I/O background tasks to increase the time spent performing the non-I/O background tasks; and adjusting the last computed value of the busy level based on redistribution of time.

10. The method of claim 1 wherein the background operations comprise pending non-I/O background tasks including data copy related activities.

11. The method of claim 1 wherein the duration of the time slots is a user-configurable parameter.

* * * * *

UNITED STATES PATENT AND TRADEMARK OFFICE
CERTIFICATE OF CORRECTION

PATENT NO. : 7,146,439 B1 Page 1 of 1
APPLICATION NO. : 10/607653
DATED : December 5, 2006
INVENTOR(S) : Ofer at al.

It is certified that error appears in the above-identified patent and that said Letters Patent is hereby corrected as shown below:

Column 3, line 23, delete "e.g. SnapView™" and replace with -- (e.g. SnapView™--.

Column 7, line 39, delete "greater that" and replace with -- greater than --.

Column 7, line 67, delete "keep tracks" and replace with -- keeps track --.

Column 9, lines 8-9, delete "wherein the busy level is levels are" and replace with -- wherein the busy levels are --.

Signed and Sealed this

Thirteenth Day of February, 2007

JON W. DUDAS
*Director of the United States Patent and Trademark Office*